United States Patent
Liu et al.

(10) Patent No.: US 11,303,665 B2
(45) Date of Patent: Apr. 12, 2022

(54) SYSTEMS AND METHODS CONFIGURING A UNIFIED THREAT MACHINE LEARNING MODEL FOR JOINT CONTENT AND USER THREAT DETECTION

(71) Applicant: Sift Science, Inc., San Francisco, CA (US)

(72) Inventors: Wei Liu, San Francisco, CA (US); Fred Sadaghiani, San Francisco, CA (US)

(73) Assignee: Sift Science, Inc., San Francisco, CA (US)

( * ) Notice: Subject to any disclaimer, the term of this patent is extended or adjusted under 35 U.S.C. 154(b) by 0 days.

(21) Appl. No.: 17/347,653

(22) Filed: Jun. 15, 2021

(65) Prior Publication Data

US 2021/0314349 A1 Oct. 7, 2021

Related U.S. Application Data

(63) Continuation of application No. 16/905,465, filed on Jun. 18, 2020, now Pat. No. 11,070,585.

(60) Provisional application No. 62/942,849, filed on Dec. 3, 2019.

(51) Int. Cl.
*H04L 9/40* (2022.01)
*H04L 29/06* (2006.01)
*G06N 5/04* (2006.01)
*G06N 20/00* (2019.01)

(52) U.S. Cl.
CPC .......... *H04L 63/1441* (2013.01); *G06N 5/04* (2013.01); *G06N 20/00* (2019.01); *H04L 63/1416* (2013.01); *H04L 63/1425* (2013.01)

(58) Field of Classification Search
CPC ....... H04L 63/14–1491; H04L 63/1425; H04L 63/1416; H04L 63/1441; G06N 20/00–20; G06N 5/00–048; G06N 5/04
See application file for complete search history.

(56) References Cited

U.S. PATENT DOCUMENTS

| | | | |
|---|---|---|---|
| 2012/0304072 A1* | 11/2012 | Mercuri | G06Q 50/01 715/745 |
| 2013/0124644 A1 | 5/2013 | Hunt et al. | |
| 2015/0339477 A1 | 11/2015 | Abrams et al. | |
| 2018/0084013 A1 | 3/2018 | Dalton et al. | |
| 2018/0152471 A1 | 5/2018 | Jakobsson | |

(Continued)

*Primary Examiner* — Matthew T Henning
(74) *Attorney, Agent, or Firm* — Alee PLLC; Padowithz Aice; Chandler Scheitlin

(57) ABSTRACT

A machine learning-based system and method for identifying digital threats includes a threat service that: implements a unified threat model that produces a unified threat score that predicts both of: a level of threat of a piece of online content, and a level of threat that a target user will create a harmful piece of online content; wherein: implementing the unified threat model includes: receiving event data comprising historical content data for the target user and content data of the pending piece of online content and historical user digital activity data and real-time user activity data; and providing input of content feature data and user digital activity feature data to the unified threat model; and the unified threat model produces the unified threat score based on the content and the user digital activity data; and computes a threat mitigation action based on an evaluation of the threat score.

12 Claims, 5 Drawing Sheets

(56) References Cited

U.S. PATENT DOCUMENTS

| | | |
|---|---|---|
| 2019/0014148 A1 | 1/2019 | Foster et al. |
| 2019/0068632 A1 | 2/2019 | Foster et al. |
| 2019/0199745 A1 | 6/2019 | Jakobsson et al. |
| 2020/0211031 A1* | 7/2020 | Patil ................... G06Q 10/10 |
| 2020/0364727 A1* | 11/2020 | Scott-Green ....... G06Q 10/0635 |

* cited by examiner

200

Constructing A Unified Threat Model S210

Constructing Corpora of Training Data S220

Training the Unified Threat Model S230

Calibrating the Unified Threat Model S240

Deploying the Unified Threat Model S250

FIG. 2

SYSTEMS AND METHODS CONFIGURING A UNIFIED THREAT MACHINE LEARNING MODEL FOR JOINT CONTENT AND USER THREAT DETECTION

CROSS-REFERENCE TO RELATED APPLICATIONS

This application is a continuation of U.S. patent application Ser. No. 16/905,465, filed 18 Jun. 2020, which claims the benefit of U.S. Provisional Application No. 62/942,849, filed 3 Dec. 2019, which is incorporated in its entirety by this reference.

TECHNICAL FIELD

This invention relates generally to the digital fraud and abuse field, and more specifically to a new and useful system and method for detecting digital fraud or digital abuse and evolving underlying machine learning models in the digital fraud and abuse field.

BACKGROUND

The modern web and Internet enables entities to engage and perform an incalculable amount of activities. Many of these activities involve user-to-user activities, user-to-business activities (or the reverse), and the like. These activities between users and between users and organizational entities over the web often involve the access, use, and/or exchange of information by one or more of the parties of the activities. Because of the malleable nature of the digital realm that these activities operate within, there arise a countless number of digital threats by digital actors that aim to commit digital fraud and/or digital abuse using online services and/or Internet-accessible applications (e.g., web or mobile applications). Additionally, some of these bad digital actors may also aim to misappropriate the information (e.g., hack) being exchanged between legitimate entities to these activities. These digital threats may also be perpetrated by malicious third parties who seek to unlawfully or otherwise, impermissibly take advantage of the data or information that is exchanged or, if not exchanged, data or information about the activities or actions of users and/or businesses on the web.

Other digital threats involving a malicious party or a bad digital actor that acts unilaterally (or in concert with other malicious actors) to abuse digital resources of a service provider to perpetrate fraud or other unlawful activities that are also of significant concern to legitimate service providers and users of the Internet.

While there may currently exist some technologies that attempt to detect digital fraud and digital abuse or other malicious digital activities over the Internet, these existing technology implementations may not sufficiently detect malicious digital activities over the Internet with accuracy and in real-time to provide an opportunity for an appropriate response by an affected party. Additionally, these existing technology implementations lack the capabilities to detect new and/or never been encountered before digital threats and automatically (or near automatically) evolve the technology implementation to effectively respond and neutralize the digital threats.

Therefore, there is a need in the digital fraud and abuse field for a digital fraud and abuse solution that enables effective detection of multiple and specific digital threats involving digital fraud and/or digital abuse via digital resources of a service provider. The embodiments of the present application described herein provide technical solutions that address, at least, the need described above.

BRIEF SUMMARY OF THE INVENTION(S)

In one embodiment, a machine learning-based system for identifying digital threats includes a distributed network of computers implementing a machine learning-based digital threat mitigation service that: implements a unified threat model that produces a unified threat score that predicts both of: (a) a level of threat of an impending or a pending piece of online content, and (b) a level of threat that a target user will create a harmful piece of online content; wherein: implementing the unified threat model includes: receiving event data comprising one or more of historical content data for the target user and real-time content data of the pending piece of online content and one or more of historical user digital activity data and real-time user activity data; and providing input of content feature data and user digital activity feature data to the unified threat model extracted from the event data; and the unified threat model produces the unified threat score based on the content features and the user digital activity features; and if implementing an automated decisioning workflow: evaluates the unified threat score to one or more distinct threat score thresholds of the automated decisioning workflow; and computes a threat mitigation action based on the evaluation.

In one embodiment, an algorithmic structure of the unified threat model combines: (i) a first algorithmic structure of a first machine learning model that performs a first machine learning task for predicting a threat level of a piece of online content; and (ii) a second algorithmic structure of a second machine learning model that performs a second machine learning task for predicting a threat level of a user that creates content.

In one embodiment, for event data that include pre-content creation features, the second algorithmic structure of the second machine learning model outweighs the first algorithmic structure of the first machine learning model within the algorithmic structure of the unified threat model.

In one embodiment, for event data that include post-content creation features, the first algorithmic structure of the first machine learning model outweighs the second algorithmic structure of the second machine learning model within the algorithmic structure of the unified threat model.

In one embodiment, the machine learning-based digital threat mitigation service: maintains a pool of unified threat models comprising a plurality of distinct unified threat models; selects the unified threat model from the pool of unified threat models based on the content feature data and the user digital activity feature data.

In one embodiment, if the content feature data indicates a real-time state of pre-content creation, the machine learning-based digital threat mitigation service selects a first unified threat model from the pool of unified threat models, the first unified threat model having a first algorithmic structure that is biased for producing the unified threat score with limited content feature data that does not satisfy a content amount threshold.

In one embodiment, if the content feature data indicates a real-time state of post-content creation, the machine learning-based digital threat mitigation service selects a second unified threat model from the pool of unified threat models, the second unified threat model having a second algorithmic structure that is biased for producing the unified threat score with full content feature data that satisfies a content amount threshold.

In one embodiment, the machine learning-based digital threat mitigation service: constructs one or more corpora of machine learning training data for training the unified threat model, wherein the one or more corpora comprise training sample data of both user activity data and content-based data, the user activity data relates to data derived from activities of one or more users performing actions in an online environment, and the content-based data relates to data derived from topics or matters treated in a written or graphical work that is accessible or published online.

In one embodiment, the machine learning-based digital threat mitigation service: constructs multiple distinct corpora of machine learning training data for training multiple distinct unified threat models, wherein the multiple distinct corpora of machine learning training data includes: (1) a first corpus of training data having pre-content creation training data samples; (2) a second corpus of training data having at-content creation training data samples; and (3) a third corpus of training data having post-content creation training data samples.

In one embodiment, the unified threat machine learning model comprises one of: (1) a pre-content creation unified threat model that is trained to produce the unified threat score based at least on pre-content creation data; (2) an at-content creation unified threat model that is trained to produce the unified threat score based at least on at-content creation data; (3) a post-content creation unified threat model that is trained to produce the unified threat score based at least on post-content creation data.

In one embodiment, the unified threat model comprises: (1) a first machine learning model that produces a first threat score indicating a threat level of the piece of pending online content or a piece of impending online content; and (2) a second machine learning model that produces a second threat score indicating a threat level of the target user, the unified threat score is produced based on an interaction of the first threat score and the second threat score.

In one embodiment, a machine learning-based method for identifying digital threats, the method comprising: implementing, via a distributed network of computers, a unified threat model that produces a unified threat score that predicts both of: (a) a level [probability] of threat of an impending or a pending piece of online content, and (b) a level [probability] of threat that a target user will create a harmful piece of online content; wherein: implementing the unified threat model includes: receiving event data comprising one or more of historical content data for the target user and real-time content data of the pending piece of online content and one or more of historical user digital activity data and real-time user activity data; and providing input of content feature data and user digital activity feature data to the unified threat model extracted from the event data; and the unified threat model produces the unified threat score based on the content features and the user digital activity features; and if implementing an automated decisioning workflow: evaluating the unified threat score to one or more distinct threat score thresholds of the automated decisioning workflow; and computing a threat mitigation action based on the evaluation.

In one embodiment, an algorithmic structure of the unified threat model combines: (i) a first algorithmic structure of a first machine learning model that performs a first machine learning task for predicting a threat level of a piece of online content; and (ii) a second algorithmic structure of a second machine learning model that performs a second machine learning task for predicting a threat level of a user that creates content.

In one embodiment, for event data that include pre-content creation features, the second algorithmic structure of the second machine learning model outweighs the first algorithmic structure of the first machine learning model within the algorithmic structure of the unified threat model.

In one embodiment, for event data that include post-content creation features, the first algorithmic structure of the first machine learning model outweighs the second algorithmic structure of the second machine learning model within the algorithmic structure of the unified threat model.

In one embodiment, a machine learning-based system for identifying digital threats includes a distributed network of computers implementing a machine learning-based digital threat mitigation service that: implements a unified threat model that produces a unified threat score that predicts both of: (a) a probability of threat of an impending or a pending piece of online content, and (b) a level probability of threat that a target user will create a harmful piece of online content; wherein: implementing the unified threat model includes: receiving event data comprising one or more of historical content data for the target user and real-time content data of the pending piece of online content and one or more of historical user digital activity data and real-time user activity data; and providing input of content feature data and user digital activity feature data to the unified threat model extracted from the event data; and the unified threat model produces the unified threat score based on the content features and the user digital activity features; and if implementing an automated decisioning workflow: evaluating the unified threat score to one or more distinct threat score thresholds of the automated decisioning workflow; and computing a threat mitigation action based on the evaluation.

In one embodiment, an algorithmic structure of the unified threat model combines: (i) a first algorithmic structure of a first machine learning model that performs a first machine learning task for predicting a threat level of a piece of online content; and (ii) a second algorithmic structure of a second machine learning model that performs a second machine learning task for predicting a threat level of a user that creates content.

In one embodiment, the unified threat model comprises an unified threat ensemble model relating to a single machine learning model that predicts one of: (i) a composite threat score relating to a single threat score that predicts a threat of the piece of online content and the threat of the target end user and (ii) a first threat score that predicts the threat of the piece of online content and a second threat score that predicts the threat of the target end user that is combined into a single unified threat score output.

In one embodiment, the unified threat model outputs: the unified threat score and subcomponents of the unified threat score that includes: (i) a content threat score; and (ii) a target end user threat score.

BRIEF DESCRIPTION OF THE FIGURES

FIG. 2 illustrates an example method in accordance with one or more embodiments of the present application;

DESCRIPTION OF THE PREFERRED EMBODIMENTS

Figure 1:
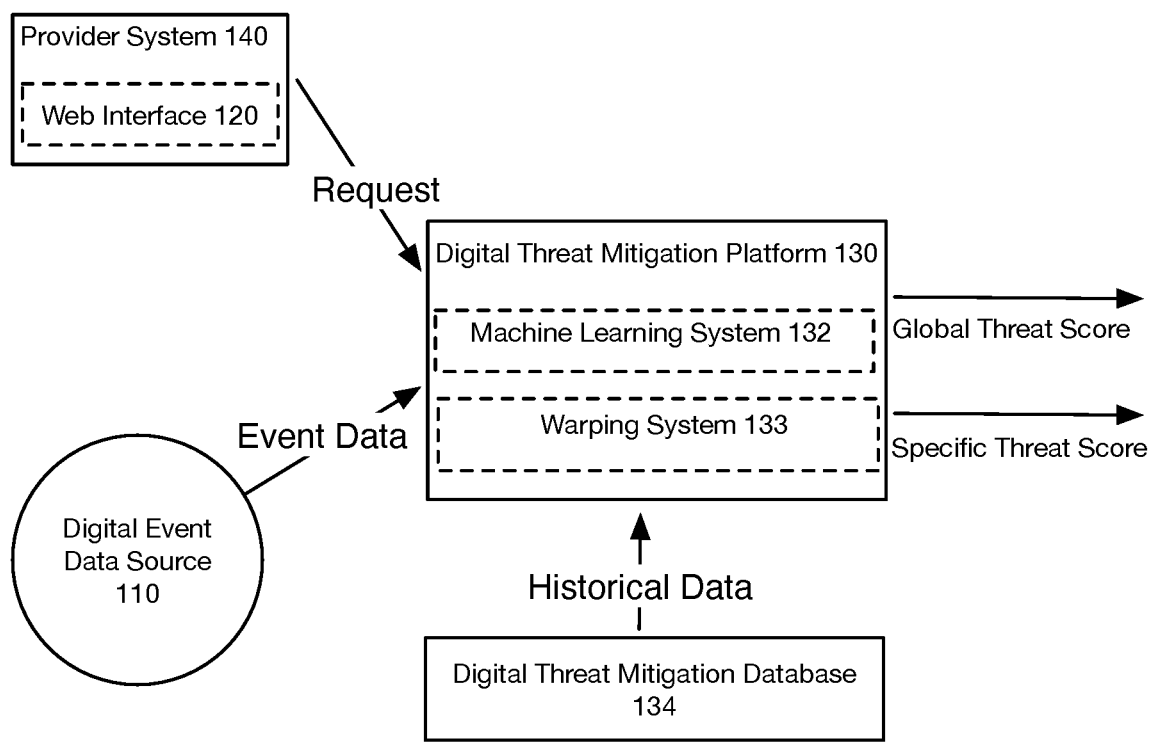
FIG. 1 illustrates a schematic representation of a system in accordance with one or more embodiments of the present application.

The following description of the preferred embodiments of the present application are not intended to limit the inventions to these preferred embodiments, but rather to enable any person skilled in the art to make and use these inventions.

1. Overview

As discussed above, digital threats are abounding and continue to evolve to circumvent existing digital fraud detection technologies. The evolving nature of digital threats compounded with the great number of transactions, events, actions, and/or activities (exceeding billions in number) occurring over the web and/or Internet highlight the many deficiencies of traditional digital fraud detection and threat mitigation implementations.

The embodiments of the present application, however, provide an advanced technology platform that is capable of ingesting billions of digital events and/or transactions over the Internet, the web, web applications, mobile applications, and the like and dynamically implement digital threat mitigation implementations that are capable of detecting malicious activities, fraudulent activities, digital abuses and generate digital threat mitigation recommendations and responses that operate to mitigate and/or eliminate the digital fraud and abuse threats stemming from the malicious or fraudulent activities, as described in U.S. Pat. No. 9,954,879, which is incorporated herein in its entirety by this reference.

The advanced technology platform of many embodiments of the present application employs a robust ensemble of machine learning models and related systems that operate to ingest the great number of digital activities performed and events occurring over the web. Accordingly, using these finely tuned and perpetually evolving and tunable machine learning models, a system implementing the several embodiments of the present application can predict a threat level and/or classify a digital threat with high accuracy and, in some embodiments, in real-time (e.g., as the event is occurring or shortly thereafter) compute a digital threat score for each event or activity that is received by the system.

The digital threat score may be exposed via a score application program interface (API) that may function to interact with various endpoints of the digital threat mitigation platform. Specifically, the score API may function to interact with one or more computing servers that implement the ensembles of machine learning models used to predict a likelihood of digital fraud and/or digital abuse. The score API may function to return a value (e.g., a number, likelihood or probability, or other criterion) that indicates how likely it is that an actor involved or associated with digital events and/or activities is a malicious actor or may be perpetrating cyber fraud or digital abuse (e.g., payment abuse, etc.). Accordingly, the digital threat score calculated by the score API may be used in several manners including to inform digital event data processing decisions (e.g., deny, hold, or approve digital transaction) or to define which of one or more digital threat mitigation protocols or implementations that should be applied to future digital event data and/or current the digital events to mitigate or eliminate a digital threat associated therewith. Additionally, or alternatively, in one or more embodiments, digital event data processing decisions may be automated via automated decisioning workflows, as described in U.S. Pat. No. 9,954,879, which is incorporated herein in its entirety by this reference and digital event data processing decisions may be performed with manual input from one or more human analysts or the like. In such embodiments, decisions output from one or more review queues of the one or more human analysts may be converted to training data for training and improving one or more threat classifying models of the threat mitigation service including, but not limited to, an unified threat model.

Additionally, recognizing that traditional spam detection models often only consider a body of text of specific content for suspicious language signals, this strategy of spam detection may make it difficult to identify a risky user before the risky user creates a piece of harmful content. One or more embodiments of the present application, however, may function to construct and implement a unified threat machine learning model that is capable of ingesting user signals together with content signals that may identify risky users before harmful content may be created.

2. System for Digital Fraud and/or Abuse Detection and Scoring

As shown in FIG. 1, a system 100 for detecting digital fraud and/or digital abuse includes one or more digital event data sources 110, a web interface 120, a digital threat mitigation platform 130, and a service provider system 140.

The system 100 functions to enable a prediction of multiple types of digital abuse and/or digital fraud within a single stream of digital event data. The system 100 provides web interface 120 that enables subscribers to and/or customers of a threat mitigation service implementing the system 100 to generate a request for a global digital threat score and additionally, make a request for specific digital threat scores for varying digital abuse types. After or contemporaneously with receiving a request from the web interface 120, the system 100 may function to collect digital event data from the one or more digital event data sources 110. The system 100 using the digital threat mitigation platform 130 functions to generate a global digital threat score and one or more specific digital threat scores for one or more digital abuse types that may exist in the collected digital event data.

The one or more digital event data sources 110 function as sources of digital events data and digital activities data, occurring fully or in part over the Internet, the web, mobile applications, and the like. The one or more digital event data sources 110 may include a plurality of web servers and/or one or more data repositories associated with a plurality of service providers. Accordingly, the one or more digital event data sources 110 may also include the service provider system 140.

The one or more digital event data sources 110 function to capture and/or record any digital activities and/or digital events occurring over the Internet, web, mobile applications (or other digital/Internet platforms) involving the web servers of the service providers and/or other digital resources (e.g., web pages, web transaction platforms, Internet-accessible data sources, web applications, etc.) of the service providers. The digital events data and digital activities data collected by the one or more digital event data sources 110 may function as input data sources for a machine learning system 132 of the digital threat mitigation platform 130.

The digital threat mitigation platform 130 functions as an engine that implement at least a machine learning system 132 and, in some embodiments, together with a warping system 133 to generate a global threat score and one or more specific digital threat scores for one or more digital abuse types. The digital threat mitigation platform 130 functions to interact with the web interface 120 to receive instructions and/or a digital request for predicting likelihoods of digital fraud and/or digital abuse within a provided dataset. The digital threat mitigation engine 130 may be implemented via one or more specifically configured web or private computing servers (or a distributed computing system) or any suitable system for implementing system 100 and/or method 200.

The machine learning system 132 functions to identify or classify features of the collected digital events data and digital activity data received from the one or more digital event data sources 110. The machine learning system 132 may be implemented by a plurality of computing servers (e.g., a combination of web servers and private servers) that implement one or more ensembles of machine learning models. The ensemble of machine learning models may include hundreds and/or thousands of machine learning models that work together to classify features of digital events data and namely, to classify or detect features that may indicate a possibility of fraud and/or abuse. The machine learning system 132 may additionally utilize the input from the one or more digital event data sources 110 and various other data sources (e.g., outputs of system 100, system 100 derived knowledge data, external entity-maintained data, etc.) to continuously improve or accurately tune weightings associated with features of the one or more of the machine learning models defining the ensembles.

The warping system 133 of the digital threat mitigation platform 130, in some embodiments, functions to warp a global digital threat score generated by a primary machine learning ensemble to generate one or more specific digital threat scores for one or more of the plurality of digital abuse types. In some embodiments, the warping system 133 may function to warp the primary machine learning ensemble, itself, to produce a secondary (or derivative) machine learning ensemble that functions to generate specific digital threat scores for the digital abuse and/or digital fraud types. Additionally, or alternatively, the warping system 130 may function to implement a companion machine learning model or a machine learning model that is assistive in determining whether a specific digital threat score should be generated for a subject digital events dataset being evaluated at the primary machine learning model. Additionally, or alternatively, the warping system 133 may function to implement a plurality of secondary machine learning models defining a second ensemble that may be used to selectively determine or generate specific digital threat scores. Accordingly, the warping system 133 may be implemented in various manners including in various combinations of the embodiments described above.

The digital threat mitigation database 134 includes one or more data repositories that function to store historical digital event data. The digital threat mitigation database 134 may be in operable communication with one or both of an events API and the machine learning system 132. For instance, the machine learning system 132 when generating global digital threat scores and specific digital threat scores for one or more specific digital abuse types may pull additional data from the digital threat mitigation database 134 that may be assistive in generating the digital threat scores.

The ensembles of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, DBSCAN, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) can be used in generating endpoint health intelligence and/or other data relevant to the system 100.

The service provider 140 functions to provide digital events data to the one or more digital event data processing components of the system 100. Preferably, the service provider 140 provides digital events data to an events application program interface (API) associated with the digital threat mitigation platform 130. The service provider 140 may be any entity or organization having a digital or online presence that enable users of the digital resources associated with the service provider's online presence to perform transactions, exchanges of data, perform one or more digital activities, and the like.

The service provider 140 may include one or more web or private computing servers and/or web or private computing devices. Preferably, the service provider 140 includes one or more client devices functioning to operate the web interface 120 to interact with and/or communication with the digital threat mitigation engine 130.

The web interface 120 functions to enable a client system or client device to operably interact with the remote digital threat mitigation platform 130 of the present application. The web interface 120 may include any suitable graphical frontend that can be accessed via a web browser using a computing device. The web interface 120 may function to provide an interface to provide requests to be used as inputs into the digital threat mitigation platform 130 for generating global digital threat scores and additionally, specific digital threat scores for one or more digital abuse types. Additionally, or alternatively, the web (client) interface 120 may be used to collect manual decisions with respect to a digital event processing decision, such as hold, deny, accept, additional review, and/or the like. In some embodiments, the web interface 120 includes an application program interface that is in operable communication with one or more of the computing servers or computing components of the digital threat mitigation platform 130.

The web interface 120 may be used by an entity or service provider to make any suitable request including requests to generate global digital threat scores and specific digital threat scores. In some embodiments, the web interface 120 comprises an application programming interface (API) client and/or a client browser.

Additionally, as shown in FIG. 2-FIG. 5, the systems and methods described herein may implement the digital threat mitigation platform in accordance with the one or more embodiments described in the present application as well as in the one or more embodiments described in U.S. patent application Ser. No. 15/653,373, which is incorporated by reference in its entirety.

3. Method for Constructing and Implementing a Unified Threat Model for Content-Based Abuse and/or Threat Detection As shown in FIG. 2, the method 200 for constructing a unified threat machine learning model S210, defining one or more corpora of user activity data and content-based data for training a unified threat model S220, training a unified threat model and computing weights S230, calibrating the unified threat model S240, and deploying the unified threat machine learning model S250.

3.1 Unified Threat Model Construction

S210, which includes constructing a unified threat machine learning model, may function to define a wholly integrated and/or unified machine learning model (unified threat model) that predicts one or more of a user threat identification and a content threat identification. In a preferred embodiment, the unified machine learning model preferably functions to predict or output a threat scoring value (e.g., threat score=68) for either or both of a user threat identification and the content threat identification. However, in a variant of one or more embodiments, the unified machine learning model may function to output a prediction label (e.g., threat=high, medium, low; user threat=good user, bad user; content threat=bad content, good content, etc.) for either or both of a user threat identification and the content threat identification.

Figure 3:
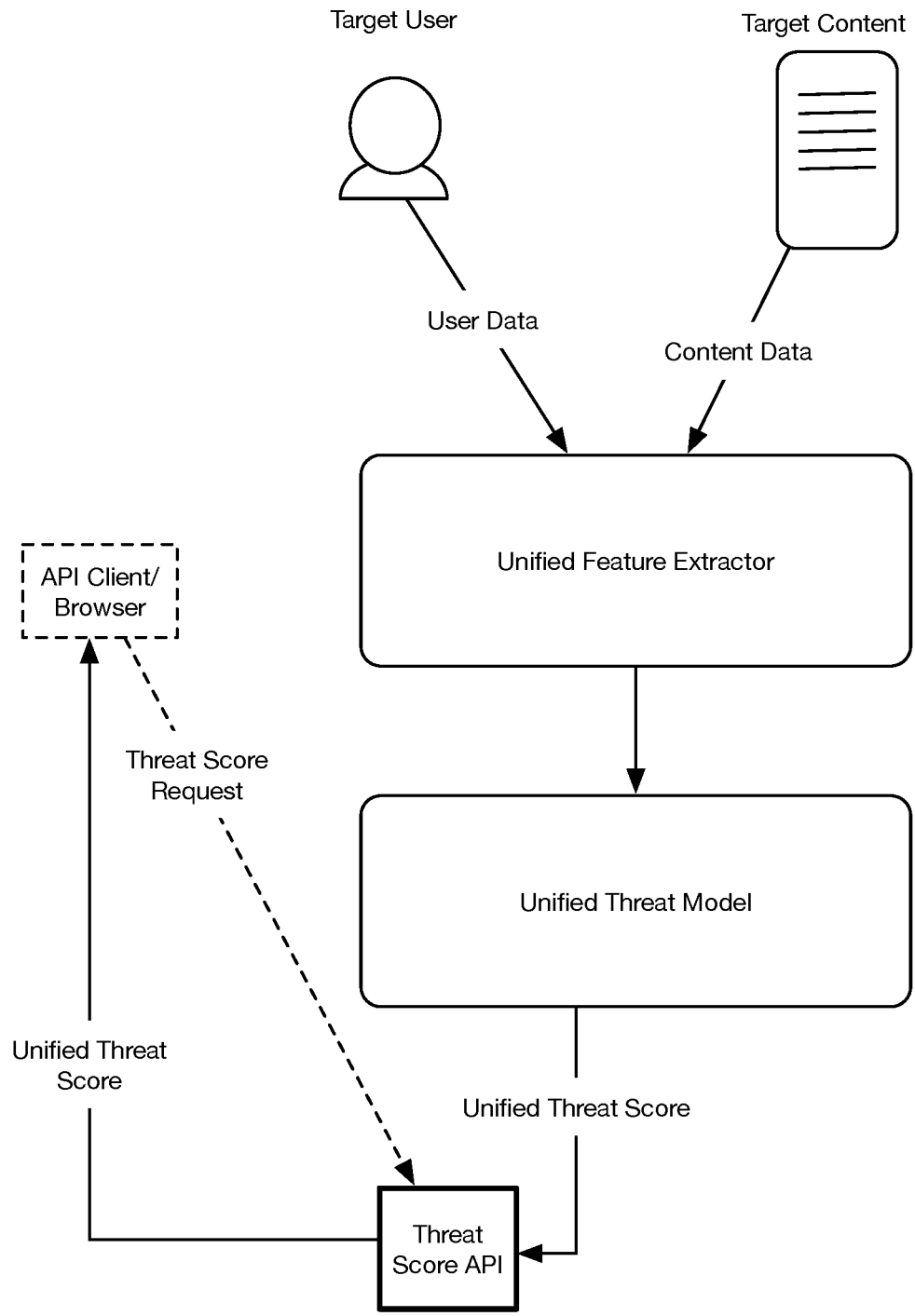
FIG. 3 illustrates an example schematic of a digital threat mitigation platform in accordance with one or more embodiments of the present application.

In a first implementation, S210 may function to construct a unified threat model based on an integration and/or a synthesis of distinct model features for each of content threat prediction and user threat prediction, as shown by way of example in FIG. 3. In this first implementation, the unified threat model preferably comprises a single machine learning model having a model feature construction and/or arrangement having weighted model feature components for each of content threat prediction and user threat prediction. That is, the unified threat model may include model component features that enable dual and/or simultaneous prediction for user threat identification and content threat identification. Thus, the model feature components for each of content threat identification and user threat identification may function to interact with each other in a singular, integrated machine learning algorithm.

Accordingly, the unified threat model may include a joint and integrated algorithmic structure that combines a first algorithmic structure of a first machine learning model for predicting and producing threat scores for a first threat type, such as a user threat, and a second algorithmic structure of a second machine learning model for predicting and producing threat scores a second distinct threat type, such as a threat of harmful online content. In such embodiments, S210 may function to provide a wholly-integrated, joint, or otherwise, unified threat model in which a single, common algorithmic structure may function to perform two distinct machine learning tasks including predicting for two distinct threats with one unified or combined score.

Figure 4:
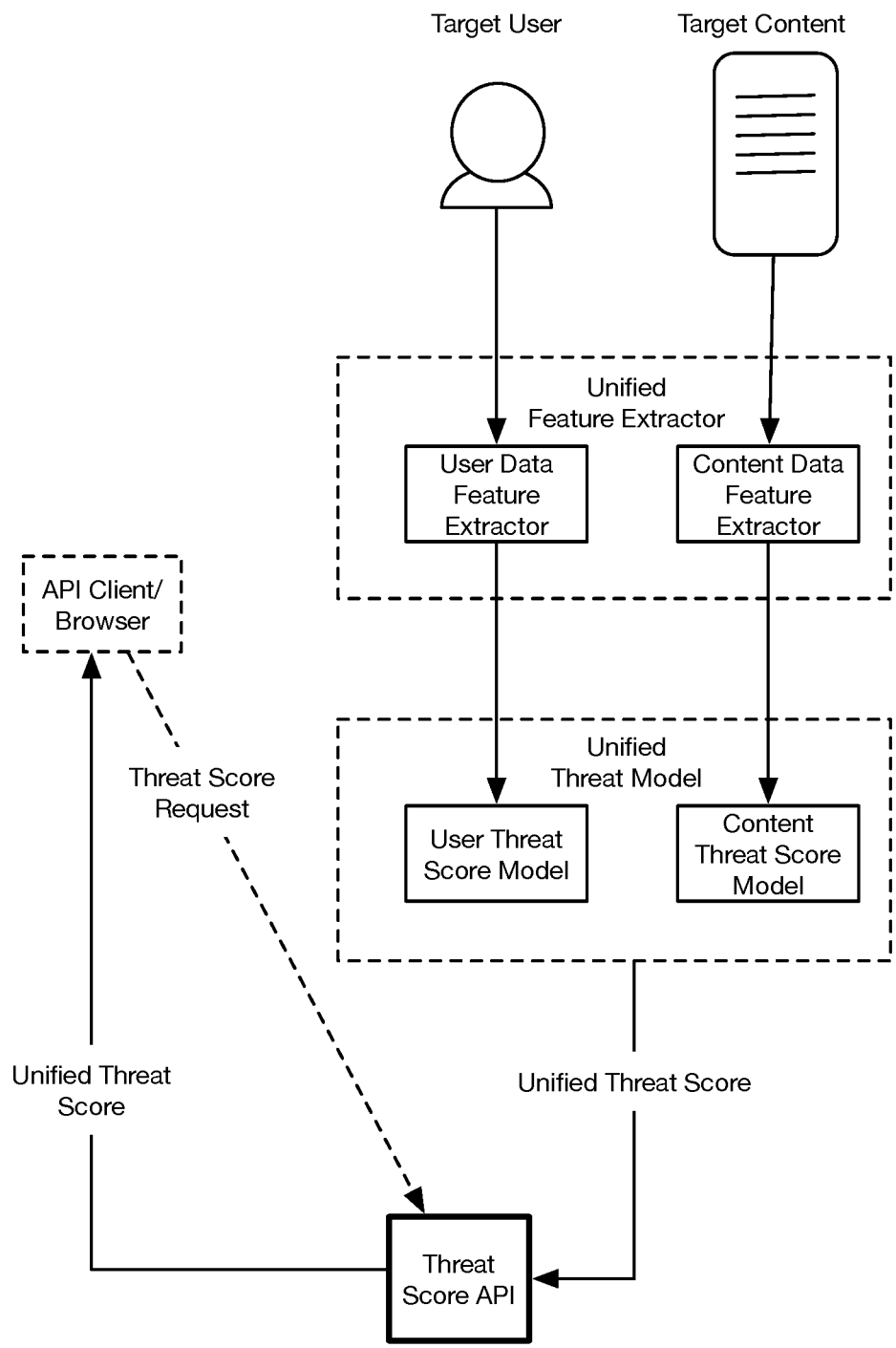
FIG. 4 illustrates an example schematic of a digital threat mitigation platform in accordance with one or more embodiments of the present application.
Figure 5:
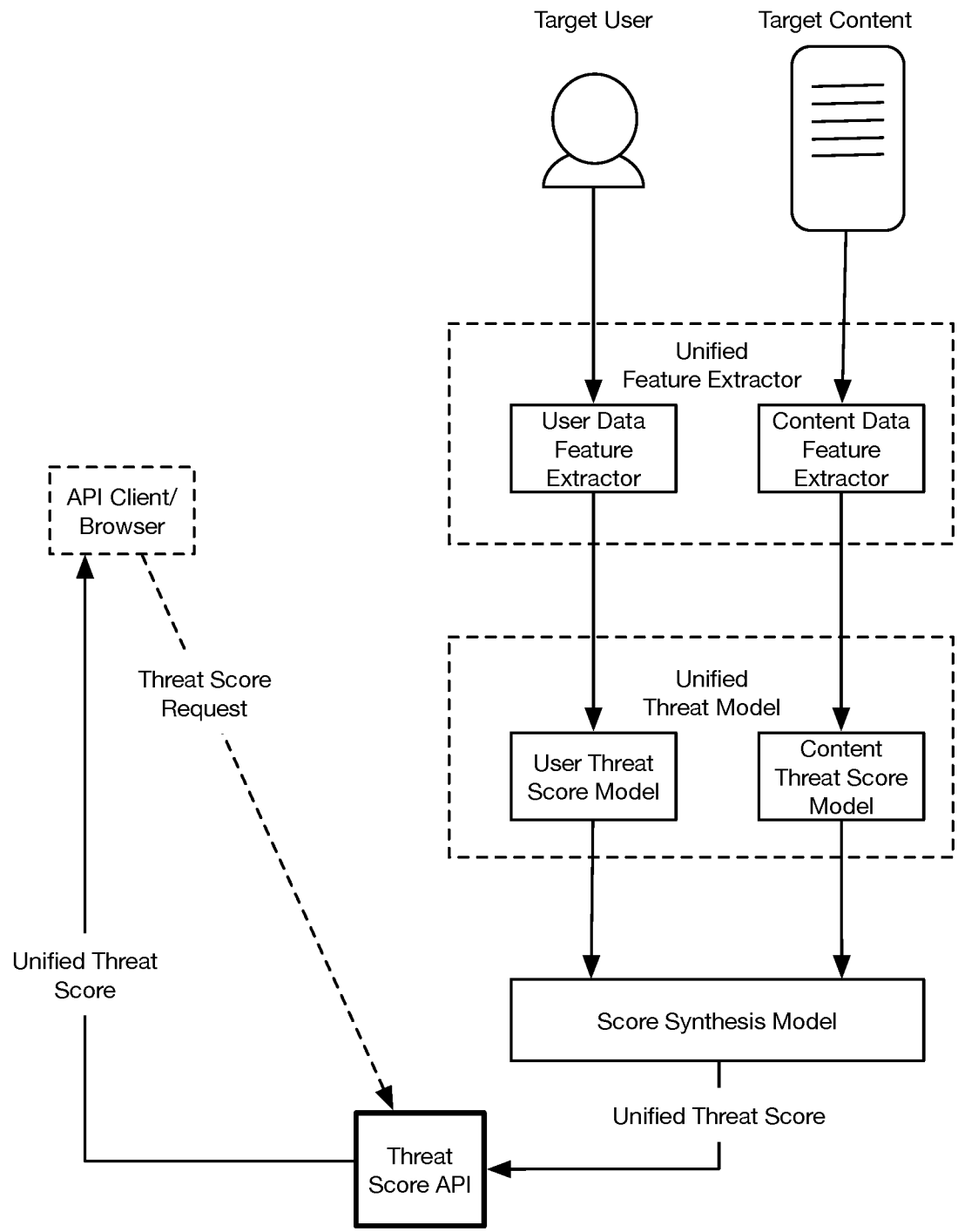
FIG. 5 illustrates an example schematic of a digital threat mitigation platform in accordance with one or more embodiments of the present application.

In a second implementation, S210 may function to construct a unified threat model based on integrating a first distinct user threat machine learning model and a second distinct content threat machine learning model, as shown by way of example in FIG. 4. In this second implementation, the user threat model and the content threat model may function to operate in parallel to produce a unified threat score based on user activity and/or user-created content. In this second implementation, each of the first distinct user threat model and the second distinct content threat model may operate independently and/or in parallel to respectively produce a user threat score and a content threat score based on user activity features and/or content-based features of a given online activity. S210 may enable the user activity threat score output and the content threat score output of the respective user threat model and the content threat model to interact to produce a unified threat score for a given user and/or a given content, as shown by way of example in FIG. 4. Thus, in this second implementation, the first distinct user threat score model and the second distinct user threat score model may function to define a unified threat ensemble for predicting a threat of a target user and/or of content created by the target user.

In some embodiments, S210 may function to implement a weighting factor that may increase a bias of one of the content threat score and the user threat score. The weighting factor may be generated and/or selected based on one or more attributes or features of digital event or online activity data for a target event for which the unified threat score is being produced.

In the second implementation, S210 may function to provide the user threat score and the content threat score as input into a third distinct model that operates to produce the unified threat score. Depending on one or more circumstances of the given user activity and/or content-based activity, the third distinct model may function dynamically adjust a weighting of the user threat score and content threat score inputs. For instance, if the content threat score is produced using content-based activity performed at a creation of a subject content, S210 may function to dynamically adjust a weighting for each of the user threat score and the content threat score in the third distinct model.

In a third implementation, S210 may function to implement an unified threat ensemble model preferably relating to a single (integrated) machine learning model that predicts one of (i) a composite threat score relating to a single threat score that predicts a threat of a piece of online content (e.g., pre-content posting, active or pending content posting, and/or after, post content posting) and the threat of the target end user performing harmful online activities and (ii) a first threat score that predicts the threat of the piece of online content and a second threat score that predicts the threat of the target end user that may be combined into a single unified threat score output.

Additionally, or alternatively, in one or more embodiments involving the third implementation, if the unified threat ensemble model producing the first threat score for content and the second threat score for the user, S230 (as described below) may function to train the unified threat ensemble model how to combine the output of the first threat score and the second threat score based on circumstances and/or details of a subject event, such as whether the event includes a pre-content posting event, an at-posting event, and/or an after or post-content posting event. That is, event data relating to a state of a posting of the online content may influence a classification and/or inference the unified threat ensemble model, such that the ensemble model make a determination as to an extent to which the threat scoring component relating to the content status and/or content, per se, should be weighed in an overall computation of and output of the unified threat score.

In a variant of the third implementation, in some embodiments, the unified ensemble model may function to receive distinct threat score outputs from multiple upstream machine learning models including, at least, a first model for scoring content threat and a second model for scoring threat of a target end user. In such variant, the unified ensemble model may function to receive the distinct output threat scores from the upstream models, learn and/or be trained on optimal combinations and weightings for each distinct threat score, and output a final unified threat score for a given event and/or a target end user.

3.2 Training Data Corpus Aggregation

S220, which includes defining one or more corpora of user activity data and content-based data for training a unified threat model, may function to construct one or more corpora of user activity data and content-based data that may be used in a training and/or a validation of the unified threat model. User activity data preferably includes data relating to activities of a user that are preferably performed in an online (e.g., Internet-based) setting that involves a user interacting with one or more online resources and/or one or more services of a subscriber to the digital threat scoring service. For instance, user activity data may include data relating to a plurality of online transactions performed by users operating online. Some examples of user data and/or user activity data may include an account age of a user, number of activities performed by a user in a period (e.g., in the past day), an email address of a user, and the like. Content-based data preferably relates to topics or matters treated in a written and/or graphical work that may be accessible or published online or via one or more web-accessible resources. Additionally, or alternatively, content-based data may include image data, video data, and/or audio data (any suitable media or digital indicia). For example, content-based data may include data relating to a number of emails in a piece of content, language used in a piece of content, a length of content, an IP address from which content was created and/or updated. In a preferred embodiment, S220 may function to source the user activity data via an API, such as the events API, to obtain transaction data, activity data, and the like directly from one or more online-accessible data sources associated with a subscriber to the digital threat scoring service or a system implementing the method 200.

Accordingly, in some embodiments, S220 may function to construct a first corpus of data of machine learning training examples that includes user activity data. In some embodiments, S220 may function to construct multiple distinct corpora of user activity data in which each of the distinct corpus of the multiple distinct corpora of user activity data may be defined by user data associated with a distinct stage or a span of online user activity. For instance, a first stage or span may include activities of a user prior to a creation of online content, a second stage or span may include activities of a user at a creation of online content, and a third stage or span may include activities of a user post creation of one or more online content, and the like. Thus, for each distinct stage or distinct span of online user activity data, S220 may function to construct a data corpus for each span to enable a tailored training of a threat model for generating predictions based on the distinct stage in which the user may be performing one or more activities. Accordingly, in one or more embodiments, the user activity threat prediction model component of the unified threat model may include an ensemble of multiple distinct user activity threat models. In such embodiments, each distinct user activity model defining the ensemble may be training using one of the distinct corpus of user activity data for a given stage of content creation.

Additionally, or alternatively, in a construction of a corpus of training data examples, S220 may function to divide or partition the dataset of the corpus based on time (e.g., data prior to a specific cutoff data (for training) and after a cutoff data (for testing)). The corpus may additionally or alternatively be divided based on manual decisions from subscribers and/or analysts. In such embodiments, the basis of division of the corpus may be splitting a corpus between training examples receiving an adverse decision (e.g., block, cancel, bad, etc.) and training examples receiving a non-adverse decision (e.g., accept, good, etc.).

Additionally, or alternatively, S220 may function to construct a second corpus of data of machine learning training examples that includes content-based data. In some embodiments, S220 may function to source content examples from one or more subscribers to the digital threat mitigation service. In one embodiment, in the case a subscriber-specific unified threat model is constructed, as described in U.S. Pat. No. 10,491,617, which is incorporated herein in its entirety by this reference, S220 may function to source content specific to the subscriber for which the unified threat model is constructed for scoring threats relating to user activities performed with resources that affect or resources of the subscriber.

Additionally, or alternatively, S220 may function to source training data directly from a subscriber or customer of the threat mitigation service. In such embodiments, the subscriber may provide individual and/or distinct judgments with respect to one or more events and/or transactions involving a target end user of the subscriber. For example, a subscriber may provide a decision or instructions to explicitly accept, block, cancel, hold, and/or review an event. In such example, the subscriber's instructions may be converted to training data since the subscribers instructions may be indicative of a manner in which the subscriber would prefer that the machine learning models of the threat mitigation service handles similar or like transaction.

It shall be noted that S220 may function to source content-based data from any suitable source including, but not limited to, subscribers to the digital threat scoring service, non-subscribers, crowdsourcing, the Internet, service-created examples, and/or the like.

Additionally, or alternatively, S220 may function to set a training and/or validation configuration for the one or more corpora of user activity data and content-based data. In one embodiment, S220 may function to configure the one or more corpora of user activity data and content-based data to make available only a subset of the data within the corpus for training the unified threat model, during a first training phase. In such embodiment, S220 may function to configure the corpus to make available a second subset of the data within the corpus during a second phase of validating the unified threat model. For example, S220 may function to configure the one or more corpora of user activity data and content-based data such that 55% of data from the corpus is sampled for training the unified threat model and such that 10% of data from the corpus is provided as input for validating and/or testing a performance of the unified threat model after training (i.e., the first phase) is completed.

It shall be noted that any suitable configuration and/or setting may be applied to the one or more corpora of user activity data and content-based data for the purposes of training and/or validating the unified threat model.

3.3 Ensemble Training & Weights Computation

S230, which includes training a unified threat model and computing weights, may function to train the unified threat model with the one or more corpora of user activity data and content-based data and further, compute mixture or ensemble weights for the given unified threat model. In some embodiments, S220 may function to construct and train distinct unified threat models for generating predictions for a plurality of distinct types of content. That is, in such embodiments, S230 may function to train one unified threat model for each distinct type of content based on content-based data matching the respective type of content.

In one embodiment, S230 may function to train a unified threat model according to a configuration of training/validation corpus. In such embodiment, S230 may function to train each of the respective component models of the unified threat model until a designated amount of the one or more corpora of data is deployed in the training of the unified threat model. For instance, if the one or more corpora of training data is configured to deploy 55% of the corpus in training, S230 may function to train the unified threat model until a 55% deployment threshold is satisfied. In some embodiments, S230 may function to train a single wholly integrated machine learning model that generates a single prediction that scores both user activity of a target user and content of the target user.

In a first implementation, once a unified threat model has been trained during an initial training phase, S230 may function to validate the unified threat model and contemporaneously or in parallel identify weights of the unified threat model. In particular, S230 may function to validate a performance of the unified threat model by testing the model using a subset of the one or more corpora of training data. In such embodiment, S230 may function to provide the subset of data from the one or more corpora of training data and generate (threat) scores and/or labels for a target user and/or target content. As described in more detail below, the generated scores may be validated against threat scores generated (in parallel) by a standard, non-unified threat model.

Additionally, or alternatively, S230 may function to compute and store weights for the component mixture of the unified threat model. In one embodiment, S230 may function to compute a linear set of weights for each of a plurality of distinct linear model components of the unified threat model. For instance, in one implementation, S230 may function to cause the trained unified threat model to generate a set of labeled score vectors for one or a plurality of distinct users and content, preferably identified from the one or more corpora of training data. In this implementation, S230 may function to execute a logistic regression on the set of labeled score vectors. Accordingly, the results of the logistic regression may be assigned or identified as the ensemble weights and/or mixture weights for the unified threat model.

It shall be noted that while, in some embodiments, a logistic regression may be used to compute weights for a unified threat model, any suitable computation may be used including, but not limited to, linear regression, decision forests, and grid search or the like.

Preferably, the linear set of weights computed by S230 function to optimize an area under the curve (AUC) under an ROC of the unified threat model; meaning that the unified threat model is optimized for generating accurate predictions. In some embodiments, the weights may include discrete weight values for each of the component linear models that make up a unified threat model.

In live use, the weights for a unified threat model for a given subscriber to the digital threat scoring service implementing the method 200 may be referenced and deployed in a global or standard linear (or non-linear) mixture that is implemented by the service when a threat scoring request is made for the given subscriber.

3.4 Threat Score Calibration

Optionally, or additionally, S240, which includes calibrating the unified threat model, may function to migrate a subscriber from threat scores being generated by a prior or global model to the unified threat model that may be specifically configured to handle threat scoring for the given subscriber. In particular, the threat scores generated by the unified threat model may be calibrated in accordance with the techniques and methods described in U.S. patent application Ser. No. 15/941,175 ('175), which is incorporated herein in its entirety by this reference.

Additionally, or optionally, S240 may function to test a behavior of the unified threat model to confirm that the classification or predictive accuracy of the unified threat model is improved relative to a predictive accuracy of a prior or global model. Accordingly, S240 may function to enable a same user activity data and/or content data to be received by the global model as well as the unified threat model. S240 may subsequently generate an ROC curve for each of the global model and the unified threat model to verify that the area under curve (AUC) of the ROC curve for the unified threat model is greater than the AUC of the ROC curve for the global model. In the case that the AUC of the ROC curve of the unified threat model is greater than the AUC of the ROC curve of the global model, S240 may function to validate the improved classification and/or predictive accuracy of the unified threat model.

3.5 Unified Threat Model Deployment

S250, which includes deploying the unified threat machine learning model, in a live deployment may function to return unified threat scores based on user activity data and/or content-based data. In a preferred embodiment, once the unified threat model is trained and/or validated, S250 may function to enable an online or a live mode in which unified threat scores and/or unified threat labels generated by the unified threat model may be publicly exposed via an API or the like in response to a unified threat score and/or unified threat label request made via the API or any suitable user interface system.

In some embodiments, S250 may function to deploy the unified threat machine learning model with multi-modal functionality that enables the unified threat model to operate and/or generate predictions uniquely tailored to distinct stages of a span of online user activity.

In a first mode of deploying the unified threat model, S250 may function to enable to the unified threat model to generate predictions based on pre-content creation user activity data. That is, in this first mode of deployment of the unified threat model, S250 may function to provide input feature data relating primarily and/or only to online activities of a target user ahead of a creation of a possible target content and without reference to input feature data relating to the possible target content. Preferably, this first mode of deploying the unified threat model may be implemented in advance of a target user creating any content or if S250 is unable to determine or identify whether the target user has created any content in the past. In such embodiments, S250 may function to perform a content search of one or more databases (preferably associated with the threat mitigation service or a subscriber to the threat mitigation service) using user identification data (e.g., user identifier, user digital fingerprint, user content style) of the target user and if no content is detected or returned, S250 may function to trigger a selection and/or an automatic implementation of the unified threat model in the first mode.

Accordingly, the first mode of deploying the unified threat model may function to predict whether a target user is likely to create harmful content or content that satisfies and/or exceeds a threat content threshold that may include a maximum content threat score or the like.

In this first mode of operating the unified threat model, S250 may function to reduce diminish a predictive impact of model component features of the unified threat model relating to content evaluation and scoring. That is, since in some embodiments, the pre-content creation stage may not have target content features to evaluate and produce a threat scoring component therefor. Therefore, S250 may function to modify and/or adjust the model structure of the unified threat model to curtail contributions of model scoring algorithmic components for content-based predictions. In one example, the algorithmic components for content-based predictions may remain dormant since limited or no content-based input feature data may be provided to the model for achieving its one or more predictions.

In one implementation of this first mode of operating the unified threat model, S250 may function to deactivate the model component features of the unified threat model relating to content-based predictions such that only the model component features relating to user activity-based predictions may contribute to the unified threat score.

In a second implementation, S250 may function to modify the model component features of the unified threat model relating to content-based predictions such that the weights (i.e., feature coefficients) associated with all or substantially all model component features for content-based predictions are computed to zero. That is, in such embodiments, even if there is content-based feature inputs into the model, the unified threat model may compute those model component features for content-based predictions to zero.

In a third implementation, S250 may function to provide a bias input into the unified threat model that biases the unified threat score towards a user activity-based threat score. The bias input may be an input vector that reduces and/or eliminates the coefficient values and/or weights associated with model feature components for content-based predictions.

In a second mode of deploying the unified threat model, S250 may function to enable the unified threat model to generate predictions at a creation of a target content based on user activity-based features and/or content-based features. In this second mode of deploying the unified threat model, S250 may function to provide input feature data relating to at least the target content and user activity of the target user. In one or more embodiments, at a creation of the target content preferably relates to a timing that is contemporaneous with a time of creation of the target content. Thus, in some embodiments, the second mode of deploying the unified threat model may be automatically selected and/or automatically implemented based on a detection and/or identified of a live (e.g., real-time or substantially real-time (within 24 hours or the like)) creation of the target content.

Additionally, or alternatively, in some embodiments, S250 may function to perform a content search of one or more databases (preferably associated with the threat mitigation service and/or a subscriber of the threat mitigation service) and/or one or more Internet-based resources using user identification data (e.g., user identifier, user digital fingerprint, user content style) of the target user and if a target content is detected or returned, S250 may function to trigger a selection and/or an automatic implementation of the unified threat model in the second mode.

Accordingly, the second mode of deploying the unified threat model may function to predict whether a target user and a target content of the target user present a threat.

In variant implementation, a plurality of distinct unified threat models may be configured and/or trained for each distinct stage of a span of online user activity. In such implementation, the method 200 may function to construct at least a first unified threat model that operates to return unified threat predictions at a pre-content creation stage, a second unified threat model that operates to return unified threat predictions at a content creation stage (i.e., contemporaneous with a creation of content), and a third unified threat model that operates to return threat predictions at a post-content creation stage and onward. In a variant of this implementation, the functionality and/or the second and the third unified threat models may be combined in a single unified threat model that function to return unified threat predictions for both the second and third stages of creation and post creation activity and the like.

In such implementation, the first unified threat model may function compute a prediction indicating whether a content that may be produced by a given user may be a threat. That is, at the pre-content stage, no content is created by the given user that may be operating in real-time in an online environment provided by a subscriber to the threat service or the like. However, the first unified threat model may function to predict a threat score for the probability that a prospective content by the given user may be harmful. In such embodiments, one or more inputs into the first unified threat model may include vector features or the like extracted from one or more historical content postings or the like of the given user.

In a fourth implementation, S250 may function to deploy a unified threat model that outputs a unified threat score together with threat scores associated with one or more subcomponents of the unified threat score. That is, in one or more embodiments, S250 may function to implement the unified threat score to output a first unified threat score that predicts a digital threat for online content and for a target end user potentially associated with the content, a second threat score that predicts a threat of a piece of online content only, and a third threat score that predicts a threat of a target end user only. Accordingly, such implementation S250 exposes a unified threat score, a content threat score, and user threat score instead of a single score.

In a fifth implementation, S250 may function to encode a state of the user (i.e., user state) as feature input into the unified threat score model which may function to inform an algorithmic or other structure of the unified threat score model. For example, in the case that a user may not have posted any content in the past (i.e., no historical posting), a user state may be encoded to zero (0) indicating to the threat mitigation service and/or model that no prior content for a target end user associated with an event exist. In such example, the algorithmic structure of the unified threat model may be simplified to reduce or eliminate or hold dormant a portion of the unified threat model that predicts a content threat score based on historical content data for the target end user or S250 may function to implement the unified threat model with only models or algorithmic structures of models relating to predict a threat risk associated with a target end user.

In use of one or more types and/or modes of the unified threat model, S250 may function to implement one or more feature extractors for extracting sets of features from each of user activity data of a target user and/or target user-created content. In some embodiments, S250 may function to implement a single unified feature extractor that is trained and/or configured to extract features from at least user-based activity data and content data. In such embodiments, the single feature extractor may include a combination of a trained deep learning model and a trained natural language processing model that operate to extract features from user activity data and content data, respectively. Thus, in such embodiments, the single unified feature extractor may function to provide a single input stream of feature data into the unified threat model for threat prediction generation.

Additionally, or alternatively, in one variation, the one or more feature extractors may include a dual feature extractor or a unified feature extractor operating two distinct feature extractors. In such embodiments, the unified feature extractor may include a first feature extractor comprising a deep machine learning model for extracting features from user activity data and a second feature extractor comprising a natural language processing model configured to extract features from content. In such embodiments, the unified feature extractor may function to generate two distinct input streams of feature data into the unified threat model with a first feature stream from the first feature extractor and a second feature stream from a second feature extractor.

Additionally, or alternatively, based on a threat scoring request or the like, S250 may function to automatically source a corpus of historical user activity data and a corpus of content-based data of a given user based on one or more user identifiers of the given user. In some embodiments, S250 may function to perform feature extraction on the corpus of historical user activity data and the corpus of content-based data of the given user and provide the extracted features as user activity feature input and content-based feature input into the unified threat model.

Additionally, or alternatively, in each mode of operating the unified threat model, S250 may function to extract user activity features from live (e.g., real-time or substantially real time) and/or extract content-based features of live content (e.g., contemporaneously or real-time created content or content being created) and provide the extracted features as user activity feature input and content-based feature input into the unified threat model.

Accordingly, based on user activity feature inputs and content-based feature inputs into the unified threat model, S250 may function to generate a unified threat score and preferably, return the unified threat score to a requestor via a threat score API or the like.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed:

1. A machine learning-based method for identifying digital threats, the method comprising:
    at a machine learning-based digital threat mitigation service:
    identifying one or more corpora of digital activity data of a target user, wherein the one or more corpora of digital activity data includes (i) online activity data of the target user on an online medium of a subscriber to the machine learning-based digital threat mitigation service and (ii) pending content-posting data of a non-published piece of content produced by the target user on the online medium of the subscriber;
    extracting a first corpus of feature vectors based on the online activity data of the target user;
    extracting a second corpus of feature vectors based on the pending content-posting data of the non-published piece of content produced by the target user;
    in response to one or more machine learning models receiving, as input, the first corpus of feature vectors and the second corpus of feature vectors, computing by the one or more machine learning models:
    (a) a distinct user digital threat inference that indicates a user threat probability of the target user;
    (b) a distinct content digital threat inference that indicates a content threat probability of the pending content-posting data of the non-published piece of content produced by the target user; and
    (c) a distinct composite digital threat inference that is a combination of both of the distinct user digital threat inference and the distinct content digital threat inference, wherein the distinct composite digital threat inference identifies a likelihood that the non-published piece of content produced by the target user but not yet published to the online medium is harmful; and
    computing whether to approve or disapprove a publishing of the non-published piece of content based on the distinct composite digital threat inference.

2. The method according to claim 1, wherein the online activity data of the target user includes historical activity data across a plurality of distinct online transactions.

3. The method according to claim 1, wherein the pending content-posting data of the non-published piece of content produced by the target user is associated with an active session of the target user.

4. The method according to claim 1, wherein the distinct composite digital threat inference comprises a threat score value;
computing whether to approve or disapprove includes computing a threat mitigation action for disapproving the non-published piece of content if the threat score value satisfies a harmful content threshold.

5. The method according to claim 1, wherein the distinct composite digital threat inference comprises a threat score value;
computing whether to approve or disapprove includes computing a threat mitigation action for approving the non-published piece of content if the threat score value does not satisfies a harmful content threshold.

6. The method according to claim 1, wherein the one or more machine learning models include a digital activity threat machine learning model that computes the distinct user digital threat inference.

7. The method according to claim 1, wherein the one or more machine learning models include a content threat machine learning model that computes the distinct content digital threat inference.

8. A machine learning-based system for identifying digital threats, the system comprising:
a distributed network of computers implementing a machine learning-based digital threat mitigation service that:
identify one or more corpora of digital activity data of a target user, wherein the one or more corpora of digital activity data includes (i) online activity data of the target user on an online medium of a subscriber to the machine learning-based digital threat mitigation service and (ii) pending content-posting data of a non-published piece of content produced by the target user on the online medium of the subscriber;
extract a first corpus of feature vectors based on the online activity data of the target user;
extract a second corpus of feature vectors based on the pending content-posting data of the non-published piece of content produced by the target user;
in response to one or more machine learning models, receiving as input, the first corpus of feature vectors and the second corpus of feature vectors, the machine learning-based digital threat mitigation service computes by the one or more machine learning models:
(a) a distinct user digital threat inference that indicates a user threat probability of the target user;
(b) a distinct content digital threat inference that indicates a content threat probability of the pending content-posting data of the non-published piece of content produced by the target user; and (c) a distinct composite digital threat inference that is a combination of both of the distinct user digital threat inference and the distinct content digital threat inference, wherein the distinct composite digital threat inference identifies a likelihood that the non-published piece of content produced by the target user but not yet published to the online medium is harmful; and
compute whether to approve or disapprove a publishing of the non-published piece of content based on the distinct composite digital threat inference.

9. The system according to claim 8, wherein:
the distinct composite digital threat inference comprises a threat score value; and
the machine learning-based digital threat mitigation service further computes whether to approve or disapprove includes computing a threat mitigation action for disapproving the non-published piece of content if the threat score value satisfies a harmful content threshold.

10. The system according to claim 8, wherein:
the distinct composite digital threat inference comprises a threat score value; and
the machine learning-based digital threat mitigation service further computes whether to approve or disapprove includes computing a threat mitigation action for approving the non-published piece of content if the threat score value does not satisfies a harmful content threshold.

11. A machine learning-based method for identifying digital threats, the method comprising:
at a machine learning-based digital threat mitigation service:
identifying one or more corpora of digital activity data of a target user, wherein the one or more corpora of digital activity data includes (i) online activity data of the target user on an online medium of a subscriber to the machine learning-based digital threat mitigation service and (ii) pending content-posting data of a non-published piece of content produced by the target user on the online medium of the subscriber;
extracting a first corpus of feature vectors based on the online activity data of the target user;
extracting a second corpus of feature vectors based on the pending content-posting data of the non-published piece of content produced by the target user;
in response to one or more machine learning models receiving, as input, the first corpus of feature vectors and the second corpus of feature vectors, computing by the one or more machine learning models:
(a) a distinct user digital threat inference that indicates a user threat probability of the target user;
(b) a distinct content digital threat inference that indicates a content threat probability of the pending content-posting data of the non-published piece of content produced by the target user; and
(c) a distinct composite digital threat inference that is a representation of both of the distinct user digital threat inference and the distinct content digital threat inference, wherein the distinct composite digital threat inference identifies a likelihood that the non-published piece of content produced by the target user but not yet published to the online medium is harmful; and
computing whether to approve or disapprove a publishing of the non-published piece of content based on the distinct composite digital threat inference.

12. The method according to claim 11, wherein:
the one or more machine learning models is an ensemble of machine learning models that includes a user digital threat machine learning model that computes the distinct user digital threat inference and a content threat machine learning model that computes the distinct content digital threat inference.

* * * * *